US010332227B2

(12) United States Patent
Dai et al.

(10) Patent No.: US 10,332,227 B2
(45) Date of Patent: *Jun. 25, 2019

(54) MULTIPLE SOURCE WATERMARKING FOR SURVEILLANCE

(71) Applicant: International Business Machines Corporation, Armonk, NY (US)

(72) Inventors: Yu Mei Dai, Beijing (CN); Hui Wang, Beijing (CN); Wei Ying Yu, Beijing (CN); Mai Zeng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,736

(22) Filed: Dec. 26, 2018

(65) Prior Publication Data

US 2019/0130518 A1    May 2, 2019

Related U.S. Application Data

(63) Continuation of application No. 15/225,114, filed on Aug. 1, 2016, now Pat. No. 10,169,838.

(51) Int. Cl.
*G06T 1/00* (2006.01)
*G06K 9/00* (2006.01)
*H04N 19/00* (2014.01)

(52) U.S. Cl.
CPC ........ *G06T 1/0042* (2013.01); *G06K 9/00771* (2013.01); *G06T 1/0085* (2013.01); *H04N 19/00* (2013.01)

(58) Field of Classification Search
None
See application file for complete search history.

(56) References Cited

U.S. PATENT DOCUMENTS 5,960,081 A    9/1999  Vynne et al.
6,975,743 B2  12/2005  Venkatesan et al.
(Continued)

FOREIGN PATENT DOCUMENTS

| CN | 1604635   | 4/2005 |
| CN | 101938618 | 1/2011 |
| CN | 102404646 | 4/2012 |

OTHER PUBLICATIONS

Wei et al., "Research and Application of Digital Watermark for Video Copyright Protection", Computational Intelligence 3nd Security, 2009, CIS'09. International Conference on (vol. 2), Dec. 2009, pp. 246-250 (Abstract Only).

(Continued)

*Primary Examiner* — Bernard Krasnic
(74) *Attorney, Agent, or Firm* — Heslin Rothenberg Farley & Mesiti P.C.; Margaret A. McNamara, Esq.

(57) ABSTRACT

A method, computer program product, and system for generating and embedding a watermark in digital video frame include a processor obtaining a request to generate a watermark and embed the watermark in a digital video frame captured by a first monitor. Based on obtaining the request, the processor fetches from one or more pre-defined regions of a memory resource, digital video data captured by at least two monitors, where a timestamp of the digital video data is equal to a timestamp of the digital video frame. The processor generates a watermark from the digital video data by calculating a binary result of the digital video data. The processor embeds the watermark (binary result) in the digital video frame.

20 Claims, 7 Drawing Sheets

(56) References Cited

U.S. PATENT DOCUMENTS

| | | | |
|---|---|---|---|
| 7,484,100 | B1 | 1/2009 | Grossman |
| 8,934,663 | B2 | 1/2015 | Moreno De Ayala et al. |
| 10,169,838 | B2 * | 1/2019 | Dai .................. G06T 1/0042 |
| 2009/0086812 | A1 | 4/2009 | Ducharme |
| 2011/0264621 | A1 | 10/2011 | Bunoski |
| 2016/0364825 | A1 | 12/2016 | Pan |

OTHER PUBLICATIONS

Essaouabi et al., "A Wavelet-Based Digital Watermarking for Video", http://arxiv.org/ftp/arxiv/papers/0911/0911.0399.pdf, Nov. 2, 2009, pp. 29-33.

Mel et al., "The NIST Definition of Cloud Computing," National Institute of Standards and Technology, Information Technology Laboratory, Special Publication 800-145, Sep. 2011, pp. 1-7.

List of IBM Patents or Patent Applications Treated as Related, Jan. 10, 2019, 2 pages.

\* cited by examiner $$A_{watermark} = | B_{D1} \oplus C_{D1} | B_{D2} \oplus C_{D2} | B_{D3} \oplus C_{D3} | B_{D4} \oplus C_{D4} |$$

| 9:00am-3:00pm | 3:00pm-9:00pm | 9:00pm-3:00am | 3:00am-9:00am |

MULTIPLE SOURCE WATERMARKING FOR SURVEILLANCE

BACKGROUND

Video surveillance is used for security in many locations, including shopping malls, on highways, on buses, etc. The video recordings are important tools for law enforcement in the event of a crime because the video footage is often relied upon to establish the facts of the crime. Criminals are aware of video surveillance systems and therefore may attempt to delete all the video files by destroying the data on the hard disk of a recording device. However, this approach can often draw attention to the fact that a crime occurred, allowing law enforcement to discover the crime more quickly and pursue the perpetrators more expediently. Thus, to avoid arousing immediate suspicion, some criminals use more advanced technology and erase only key portions of a video, so an individual viewing the video may not be aware of the tampering and the crime takes longer to discover. A countermeasure to this approach is utilizing digital watermarking in the footage, but current systems of digital watermarking are susceptible to tampering and counterfeiting because they generate watermarks from a single source of data (e.g., the hosted signal or some properties related to the content signal). Thus, a criminal with the technological capabilities to delete a targeted portion of a video file may likely also have the technological capability to alter the watermarks associated with the video file to disguise this change.

SUMMARY

Shortcomings of the prior art are overcome and additional advantages are provided through the provision of a computer program product for generating and embedding a watermark in a digital video frame. The computer program product comprises a storage medium readable by a processing circuit and storing instructions for execution by the processing circuit for performing a method. The method includes, for instance: obtaining, by one or more processors, a request to generate a watermark and embed the watermark in a digital video frame captured by a first monitor; based on obtaining the request, fetching, by the one or more processors, from one or more pre-defined regions of a memory resource, digital video data captured by at least two monitors, wherein a timestamp of the digital video data is equal to a timestamp of the digital video frame; generating, by one or more processors, a watermark from the digital video data, wherein the generating comprises calculating a binary result of the digital video data, wherein the watermark comprises the binary result; and embedding, by one or more processors, the watermark in the digital video frame, generating a watermarked digital video frame.

Shortcomings of the prior art are overcome and additional advantages are provided through the provision of a method of generating and embedding a watermark in a digital video frame. The method includes, for instance: obtaining, by one or more processors, a request to generate a watermark and embed the watermark in a digital video frame captured by a first monitor; based on obtaining the request, fetching, by the one or more processors, from one or more pre-defined regions of a memory resource, digital video data captured by at least two monitors, wherein a timestamp of the digital video data is equal to a timestamp of the digital video frame; generating, by one or more processors, a watermark from the digital video data, wherein the generating comprises calculating a binary result of the digital video data, wherein the watermark comprises the binary result; and embedding, by one or more processors, the watermark in the digital video frame, generating a watermarked digital video frame.

Shortcomings of the prior art are overcome and additional advantages are provided through the provision of a system for generating and embedding a watermark in a digital video frame. The system comprises a memory, a processor in communication with the memory, and program instructions executable by the processor via the memory to perform a method. The method includes, for instance: obtaining, by one or more processors, a request to generate a watermark and embed the watermark in a digital video frame captured by a first monitor; based on obtaining the request, fetching, by the one or more processors, from one or more pre-defined regions of a memory resource, digital video data captured by at least two monitors, wherein a timestamp of the digital video data is equal to a timestamp of the digital video frame; generating, by one or more processors, a watermark from the digital video data, wherein the generating comprises calculating a binary result of the digital video data, wherein the watermark comprises the binary result; and embedding, by one or more processors, the watermark in the digital video frame, generating a watermarked digital video frame.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
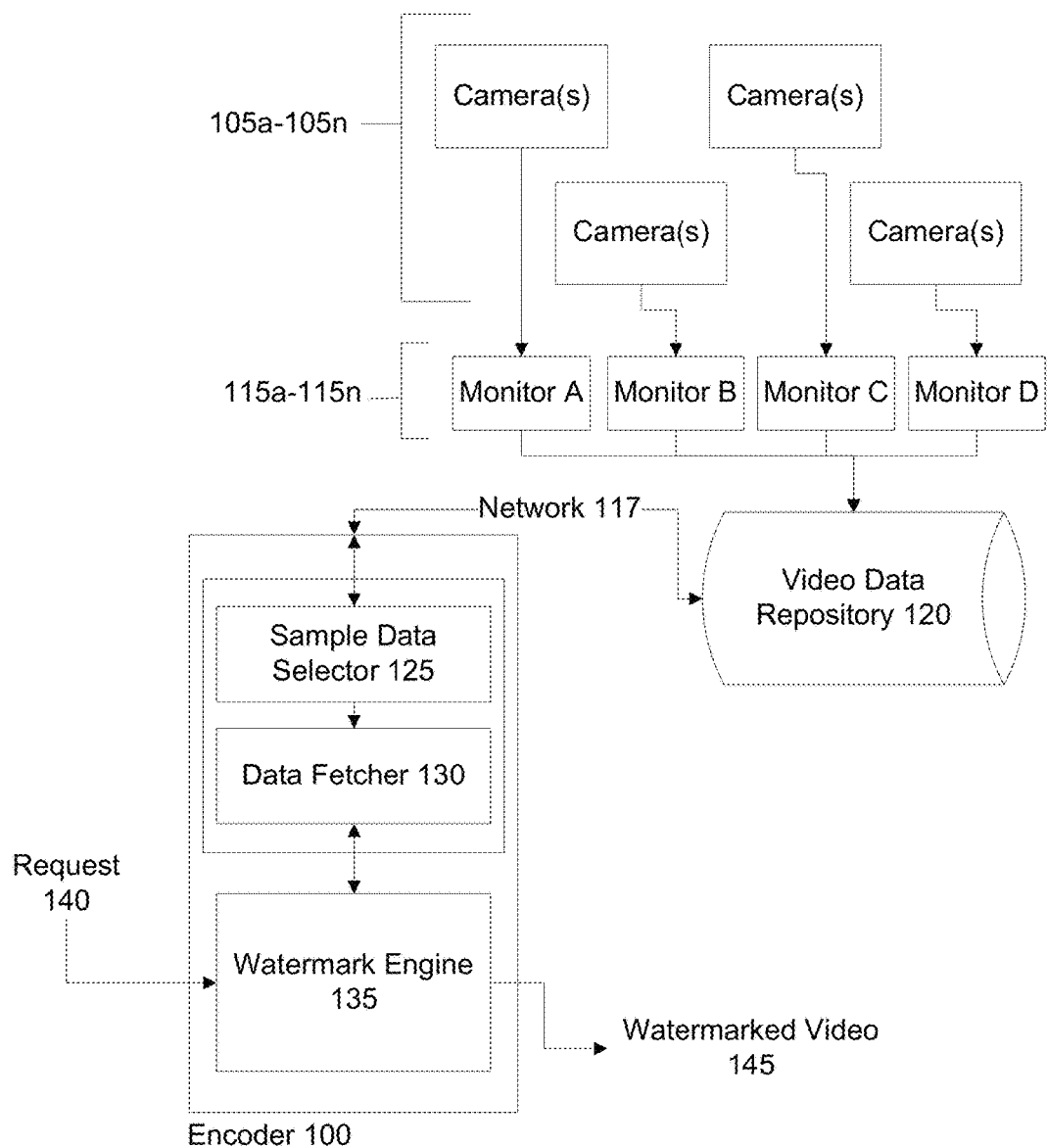
FIG. 1 is a diagram depicting aspects of a technical environment into which aspects of an embodiment of the present technique can be integrated.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figures 4, 5:
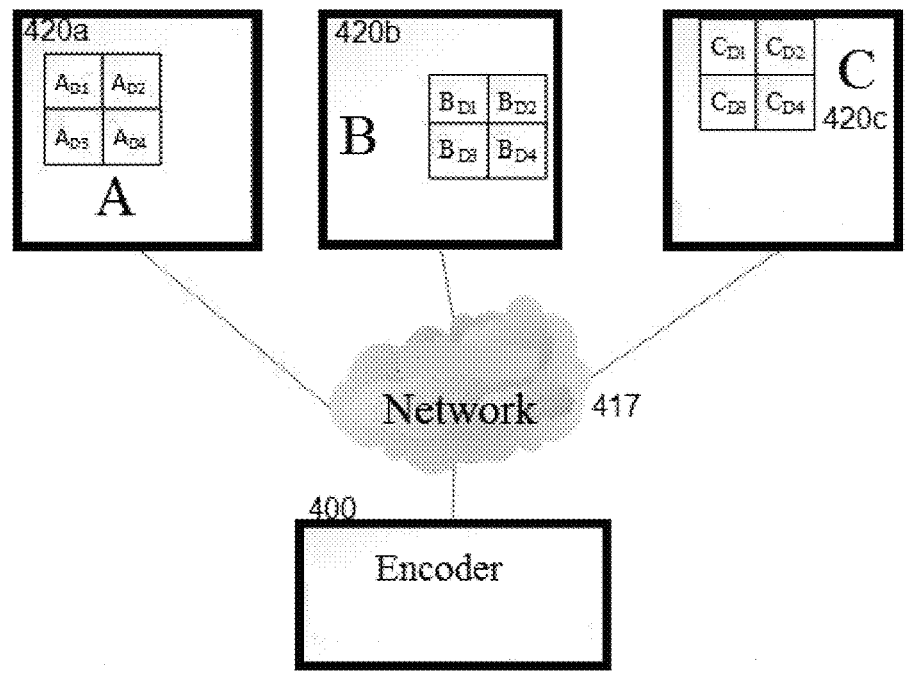
FIG. 4 depicts a technical environment comprising certain aspects of an embodiment of the present invention.
FIG. 5 illustrates certain aspects of some embodiments of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Digital watermarking describes methods and technologies that hide information, for example a number and/or text, in digital media, such as images, audio, or video. This information is embedded such that changes are imperceptible and are accomplished by making subtle changes to the data of the original digital content. Although digital watermarks are not perceived by a human observer, an effective watermark is easily detected and read by program code executing on computing nodes on networks, and in a variety of digital devices. The program code utilizes watermarks to validate the original content and/or initiate actions. Current systems generate watermarks from single source data (e.g. either the hosted signal or some properties related to the content signal).

Embodiments of the present invention represent a technological and security improvement over current video watermarking systems that generate watermarks from a single source of data, that is either the hosted signal or some properties related to the content signal, by generating watermarks from data of more than one video source. For example, embodiments of the present invention include program code that generates a digital watermark from multiple video data sources. Generating digital watermarks from multiple video data sources instead of a single source increases the complexity of the watermarks and thus, enhances the security of the video file. In an embodiment of the present invention, program code generates a watermark in each video from a given monitor by combining selected video frame regions of some or all of the other monitor videos. Thus, the program code utilizes more than one video source to create a file where each video in each frame is different from others and the watermark of every frame varies. This watermarking technique renders the video file more secure because the inconsistency of the watermarking is unpredictable and therefore, difficult to counterfeit.

Another advantage of certain embodiments of the present invention is that the accuracy of the video file is increased as well as verifiable in real time. First, the variable quality of the watermarks associated with the various frames of the multi-source video file enable real time verification of the authenticity of a video. Second, the multiple video source data guarantees the real time accuracy of the video file because the watermark is generated by program code executing at a centralized location. The real time functionality of embodiments of the present invention is enabled because the program code utilizes timestamps from video frame source data in generating watermarks.

In the event of tampering, embodiments of the present invention provide the advantage of enabling restoration of lost data because of the multiple source approach. In an embodiment of the present invention, frame recovery is simplified in the case of a targeted erasure of certain frames or portions of frames because all of the sample data used to generate watermarks and the program code supporting the encoding includes the functionality to perform an inverse operation to recover lost or corrupted data. Ease of data recovery increases because the program code constructs the watermark using the original video frame source data.

Referring to FIG. 1, for illustrative purposes only, certain embodiments of the present invention may be referred to as comprising three aspects: 1) a video data repository 120, where digital data is stored; 2) a sample data selector 125 and data fetcher 130, to define the criteria for data selection and fetch the data matching the definition from the video data repository 120; and 3) a watermark engine 135 to generate watermarks and embed the watermarks into the video. In an embodiment of the present invention, program code obtains digital data from more than one digital video source and stores the digital data in a video data repository 120. The program code (e.g., the sample data selector 125) designates a sample of the digital data to fetch and program code (e.g., the data fetcher 130) fetches a subset of the sample from the repository. The program code (e.g., the watermark engine 135) utilizes the subset of the sample data to generate a watermark with a watermarking algorithm and embeds watermarks in a video. In an embodiment of the present invention, the encoder 100 may also include a database (not pictured) which the program code (e.g., the sample data selector 125) utilizes to store the data it selects before this data is utilized by the program code (e.g., data fetcher 130 and/or watermark engine 135) to generate a watermark. The data records in this database may include formatted headers to aid the program code in identifying the data before generating a watermark.

FIG. 1 illustrates an embodiment of the present invention as including these aspects, however, the functionality attributed to each of the aspects is not indicative of any limitations regarding the distribution of the functionality of one or more programs executed by one or more processors. The separation of certain aspects in this manner is provided for ease of understanding, only.

In addition to illustrating aspects of the watermarking method of certain embodiments of the present invention, FIG. 1 also depicts aspects of a system into which aspects of an embodiment of the present invention may be implemented. Referring to FIG. 1, in an embodiment of the present invention, a surveillance system includes more than one cameras 105a-105n where more than one of the cameras 105a-105n are part of more than one monitor 115a-115n. (For consistency throughout the explanation, the monitors are also labeled A-D.) The cameras 105a-105n and their respective monitors 115a-115n may be connected to an encoder 100 via a network 117, which, for security purposes, is a private network, in an embodiment of the present invention. The encoder 100 includes program code that for ease of understanding is split into two modules. One module includes a sample data selector 125 and a data fetcher 130. A second module include a watermark engine 135. Together, the program code in these modules selects data from video data repository 120 to generate a watermark and encodes video with the generated watermark.

Although embodiments of the present invention include more than one video data source, e.g., multiple cameras 105a-105n and multiple monitors 115a-115n, the program code utilizes data from certain of the multiple sources, and the video is encoded by the encoder 100, centrally. In certain embodiments of the present invention, the program code may store the video data from each monitor 115a-115n in a separate video data repository 120 or may store the video data from all monitors 115a-115n in a single video data repository 120. Additional configurations for video storage are also possible provided that the program code divides the video data in a manner that its origin and timestamp can be identified by the program code of the encoder 100 when generating watermarks. In the embodiment of FIG. 1, the video data repository 120 stores formatted digital data of video regions, captured by the cameras 105a-105n of more than one monitor 115a-115n. For example, in an embodiment of the present invention, the program code stores video data from multiple sources (e.g., monitors 115a-115n) in the video data repository 120 with formatted headers designating at least the monitor from which each frame originated and its time stamp.

In an embodiment of the present invention, program code divides video content from more than one monitor 115a-115n into regions and stores the content into the video data repository 120, based on the time stamp of the digital data. The manner in which the program code divides the regions varies across different embodiments of the present invention. Examples of rules for dividing the source data utilized by the program code include, but are not limited to, a random divide rule, a dynamic area divide rule, a core area divide rule, and/or a change-based divide rule.

Figure 2:
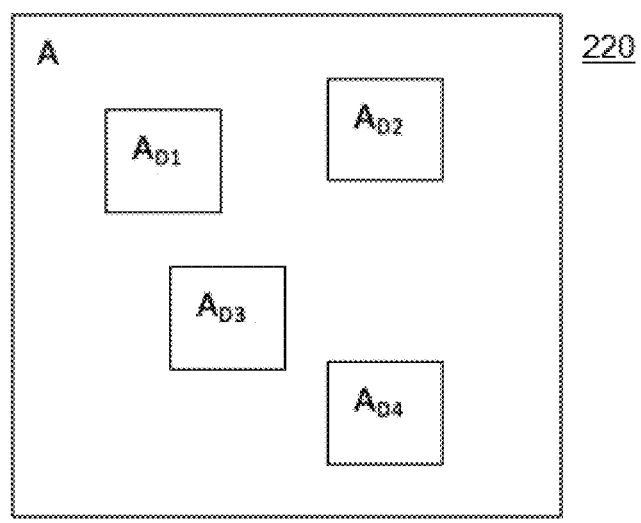
FIG. 2 illustrates certain aspects of some embodiments of the present invention.

FIG. 2 depicts an example of how digital data from a monitor "A" (which is depicted among the monitors 115a-115n of FIG. 1) is divided and stored by the program code in different regions (e.g., $A_{D1}$, $A_{D2}$, $A_{D3}$, $A_{D4}$) of a video data repository 220 (e.g., FIG. 1, 120), in an embodiment of the present invention.

Table 1 further illustrates how the program code divides the data from the "A" monitor into different regions of a video data repository 220 in an embodiment of the present invention. As seen in Table 1, digital data from a monitor with "A" as its identifier, with timestamps T1-T3 are stored in regions $A_{D1}$, $A_{D2}$, $A_{D3}$, $A_{D4}$. In an embodiment of the present invention, the video source data can be stored utilizing headers to designate both the source of the digital data and the time stamp associates with this digital data.

TABLE 1

| Monitor ID | Time Stamp | Region ID | Digital Data |
|---|---|---|---|
| A | T1 | $A_{D1}$ | XXXXXXXXX |
| A | T1 | $A_{D2}$ | XXXXXXXXX |
| ... | ... | ... | ... |
| A | T2 | $A_{D1}$ | XXXXXXXXX |
| ... | ... | ... | ... |
| A | T3 | $A_{D1}$ | XXXXXXXXX |

Figure 3:
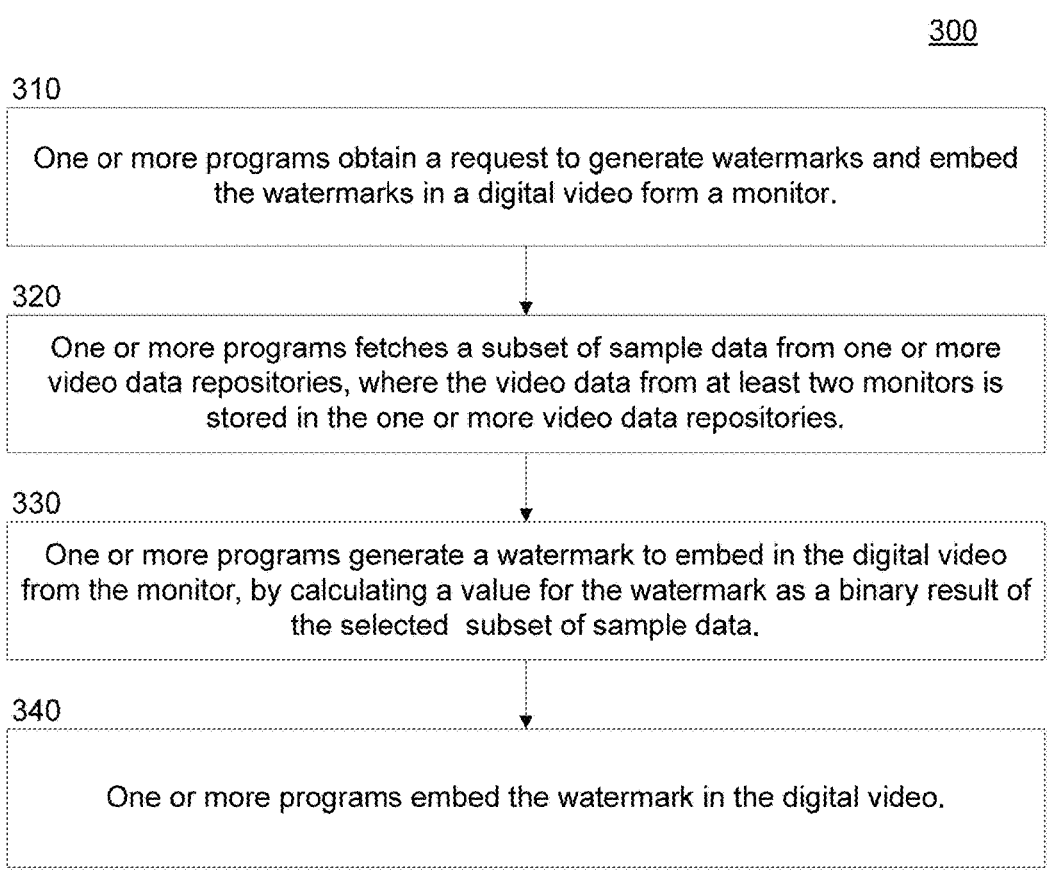
FIG. 3 depicts a workflow illustrating certain aspects of an embodiment of the present invention.

FIG. 3 is a workflow 300 of an embodiment of the present invention. For illustrative purposes, aspects of FIG. 1 are referenced throughout the description of the workflow 300 of FIG. 3.

In an embodiment of the present invention, program code (e.g., watermarking engine 135) obtains a request 140 to generate watermarks and embed the watermarks in a digital video from a monitor (310). Based on obtaining this request, the program code (e.g., data fetcher 130) fetches a subset of sample data from one or more video data repository 120 (e.g., FIG. 2, 220) utilized by more than one monitor (320). In an embodiment of the present invention, fetching the data includes the program code (e.g., sample data selector 125) selecting a subset of sample data from the (one or more) video data repository 120 to use to generate the watermark.

In an embodiment of the present invention, the program code (e.g., data selector 125) selects source data according to a pre-defined selection rule and a pre-defined combination rule, from all of monitors with the same timestamp. For example, the program code may select data from monitor "A" with a timestamp of T1 together with data from monitor "B" with a timestamp of T1. In certain embodiments of the present invention, the program code utilizes a selection rule to select specified regions from video frames with common timestamps, and the program code utilizes the combination rule to combine these selected regions.

As illustrated in FIG. 1, data fetcher 130 program code fetches the data selected by the sample data selector 125 program code and transfers it to a watermarking engine 135. Thus, as seen in FIG. 3, the program code (e.g., watermarking engine 135) generates watermarked video 145, i.e., video containing watermarks embedded in the frames. The program code (e.g., watermarking engine 135) generates watermarks responsive to a request 140 and embeds the watermarks in the video (330).

In an embodiment of the present invention, the program code (e.g., FIG. 1, watermarking engine 135) generates a watermark to embed in the digital video from the monitor, by calculating a value for the watermark as a binary result of the selected data (330). In making this calculation, the program code may utilize an encode rule, i.e., an algorithm utilized by the program code to generate a watermark. In an embodiment of the present invention, an encode rule utilized by the program code of the watermarking engine 135 is one or more of: a logic gate (XOR), a hash, and/or a binary algorithm. Based on storing video data with timestamps for each frame, in an embodiment of the present invention, the watermark in a given encoded video frame is the result of the program code applying a binary operator to digital data from more than one monitor of a multi-source surveillance system, where the digital data from more than one monitor of a multi-source surveillance system and the video frame to which the watermark is applied, share a timestamp. In an embodiment of the present invention, a portion of the sample data from which the program code ultimately generates a watermark originates from a different monitor than the digital video that is encoded.

In an embodiment of the present invention, the data utilized by the program code (e.g., watermark engine 145) is dynamic area frame data. Thus, the program code (e.g., FIG. 1, watermarking engine 135) combines the dynamic area frame data into binary data and inserts the binary into a frame of a video from monitor A, for example. In an embodiment of the present invention, the dynamic area frame data used to generate the binary data includes the same timestamp as the frame of the video into which the program code inserts the binary data as a watermark.

Returning to FIG. 3, the program code embeds the watermark into the digital video (340). In an embodiment of the present invention, the sample data utilized to generate the watermark all has the same timestamp as the frame of the video into which the program code embeds the watermark.

FIG. 4 illustrates how the program code (e.g., FIG. 1, watermarking engine 135) generates watermarks to embed in a digital video (e.g., FIG. 3, 330), in an embodiment of the present invention. In this example, program code stores video data, including dynamic area frame data, from three monitors (e.g., A, B, and C) in video data repositories 420a-420c. The three monitors and the video data repositories 420a-420c are connected to an encoder 400, which includes program code that performs the functions attributed to the sample data selector 125, the data fetcher 130, and the watermark engine 135 of FIG. 1.

As illustrated earlier in FIG. 2, the digital data from the various monitors is stored by the program code in different regions of the video data repositories 420a-420c. In an aspect of an embodiment of the present invention, the video data repository 420a in which the program code stores video data from monitor A is divided into regions $A_{D1}$, $A_{D2}$, $A_{D3}$, and $A_{D4}$. The video data repository 420b in which the program code stores the video data of monitor B is divided into regions $B_{D1}$, $B_{D2}$, $B_{D3}$, and $B_{D4}$. The video data repository 420c in which the program code stores video data from monitor C is divided into regions $C_{D1}$, $C_{D2}$, $C_{D3}$, and $C_{D4}$. In this example, regions $A_{D1}$, $B_{D1}$, $C_{D1}$, $A_{D1}$, $B_{D2}$, $C_{D2}$, $A_{D3}$, $B_{D3}$, $C_{D3}$, $A_{D4}$, $B_{D4}$, and $C_{D4}$ are regions in dynamic areas of the video from the monitors, meaning that the data is changed in almost every frame. Thus, by utilizing data from these regions in generating watermarks, the program code can create a dynamic watermark that is unpredictable and therefore, more secure.

As illustrated in FIG. 4, in an embodiment of the present invention, the program code referred to as the watermark engine of the encoder 400 combines data from the regions of the video data repositories 420a-420c and applies a binary function, which can be dictated by the aforementioned encode rule, to the selected data, to generate watermarks, which the program code embeds in the video. The program code generates the watermark in each video by applying a combination rule to determine the selected video frame regions of some or all the other monitors to encode. The program code may select the data that it combines according to a selection rule. Thus, in an embodiment of the present invention, the program code selects data from regions of the video data repositories 420a-420c according to a selection rule, combines the data from the various monitors together utilizing a combination rule, and encodes the resultant watermark to a video source in accordance with an encode rule.

FIG. 4 illustrates that the program code generates a watermark using data selected and fetched from regions of the video data repositories 420a-420c to encode video that shares a timestamp with the selected regions. However, as illustrated in Table 1, the program code may store data from a given monitor with the same time stamp in differing regions of video data repository 420a-420c and/or store data with different timestamps in the same region. Thus, in an embodiment of the present invention, the program code relies upon the selection rule and the timestamp to select data from the video data repository 420a-420c that the program code utilizes to generate a watermark.

As illustrated in Equation 1, in an embodiment of the present invention, a watermark in a frame of a video from a monitor (e.g., monitor A) is a binary function applied to data from selected regions of one or more video data repositories of one or more of the additional monitors in a multi-source surveillance system. In an embodiment of the present invention, the program code utilizes data with a common timestamp to encode a frame of source video with this same timestamp. Although Equation 1 illustrates utilizing data from three monitors to generate a watermark to encode a source, embodiments of the present invention, may utilize a selection of data from any one or more monitors to generate a watermark. Both the identity and the number of monitors referred to and the regions in Equation 1 are merely one example of an encode rule utilized by an embodiment of the present invention.

$$A_{watermark} = A_{D1} \oplus B_{D1} \oplus C_{D1} \qquad \text{Equation 1}$$

In an embodiment of the present invention, the program code utilizes a different encode rule depending upon the timing of the timestamp associated with the dynamic area frame it is encoding with a watermark. FIG. 5 illustrates the variation of an encode rule utilized by the program code depending upon the timing of the encoding. This example is offered for illustrative purposes only and as understood by one of skill in the art, the program code may utilize various data selection and encoding rules to generate and embed watermarks in video sources. As seen in FIG. 5, when adding a watermark to a dynamic area frame of video "A" (from a monitor "A") when this dynamic area frame (also referred to as a source frame) has a timestamp that is 9:00 am to before 3:00 pm, the program code applies a binary function to data that the program code fetched from a $B_{D1}$ region of a video data repository of a monitor "B" and data the program code fetched from a $C_{D1}$ region of a video data repository of a monitor "C". When the source frame's timestamp is 3:00 pm to before 9:00 pm, the program code applies a binary function to the data the program code fetched from a $B_{D2}$ region of a video data repository of a monitor "B" and the data the program code fetched from a $C_{D2}$ region of a video data repository of a monitor "C". When the source frame's timestamp is 9:00 pm to before 3:00 am, the program code applies a binary function to the data the program code fetched from a $B_{D3}$ region of a video data repository of a monitor "B" and the data the program code fetched from a $C_{D3}$ region of a video data repository of a monitor "C". Finally, when the source frame's timestamp is 3:00 am to before 9:00 am, the program code applies a binary function (e.g., XOR) to the data the program code fetched from a $B_{D4}$ region of a video data repository of a monitor "B" and the data the program code fetched from a $C_{D4}$ region of a video data repository of a monitor "C". In an embodiment of the present invention, during all intervals, the timestamp of the fetched data is equal to the timestamp of the source frame.

An advantage of utilizing an embodiment of the present invention where the encoding varies over time, as illustrated in FIG. 5, is that the watermark of each video in each frame is different from others, so it is difficult to tamper with the individual frames because the watermark of every frame is changing and unpredictable. Even if a criminal is able to discover the combination being used at a given time, the criminal cannot anticipate the next watermark combination method and/or the earlier method. As explained in reviewing Equation 1, embodiments of the present invention can also use frames of video captured in by all monitors, including the monitor that captured the source video frame. Thus, a watermark can be utilized to recover a region of data that the program code utilized to generate the watermark.

Because portions of video frames from various monitors are utilized to watermark the frames of other monitors, in embodiments of the present invention, the watermarks themselves provide a method of restoring data that is corrupted and/or lost. Thus, the watermarks provide backups to the data in the video data repositories and the program code can extract the data utilized to generate the watermarks from the encoded frames in order to restore lost data.

In an embodiment of the present invention, the program code can verify the authenticity of a video frame in real time. In the event of suspected tampering, a watermark in a video frame can be compared with a watermark generated by the program code, utilizing the selection, combination, and encode rule for video with the timestamp of the encoded frame. Provided that the video data utilized to generate the watermark is reliable (e.g., it has not been tampered with) the program code generates a watermark for the frame in question and compares the newly generated watermark to the watermark in the frame for which there is suspicion to verify that the watermarks match. Provided that the watermarks match, the suspicious video frame is verified as authentic.

As illustrated in FIGS. 1-5 embodiments of the present invention include a computer-implemented method, a system, and a computer program product, that generate and embed a watermark in digital video frame. In an embodiment of the present invention, the program code obtains a request to generate a watermark and embed the watermark in a digital video frame captured by a first monitor. Based on obtaining the request, the program code fetches from one or more pre-defined regions of a memory resource, digital video data captured by at least two monitors, where a timestamp of the digital video data is equal to a timestamp of the digital video frame. The program code generates a watermark from the digital video data by calculating a binary result of the digital video data; the watermark includes the binary result. The program code embeds the watermark in the digital video frame, generating a watermarked digital video frame. In some embodiments of the present invention, the first monitor is one of the at least two monitors, but in further embodiments, the first monitor is not one of the at least two monitors.

In an embodiment of the present invention, the memory resource includes one or more video data repositories, and each one or more video data repositories segments portions of digital video data of a monitor of the at least two monitors into regions. In some of these embodiments when the program code fetches digital video data it determines a current rule defining the one or more pre-defined regions and fetches the digital video data captured by at least two monitors from the one or more pre-defined regions defined by the rule. In an embodiment of the present invention, the program code determines the current rule is based on the timestamp of the digital video frame.

In an embodiment of the present invention, the program code calculates the binary result of the digital video data by determining a current encode rule, where the current encode rule includes an algorithm generating a binary result when applied to the digital video data, and applying the current encode rule to the digital video data. The current encode rule may include, but is not limited to, an XOR, a hash, and/or a binary algorithm. The program code may determine the current encode rule based on the timestamp of the digital video frame.

In an embodiment of the present invention, when the program code fetches the digital video data, it accesses the one or more pre-defined regions of a memory resource over a private network.

In an embodiment of the present invention, the program code restores a portion of the digital video data by deriving the digital video data from the binary result including the watermark, selecting a portion of the digital video data from the derived digital video data, and committing the portion of the digital video data, to the memory resource.

In an embodiment of the present invention, the program code verifies authenticity of the watermarked digital video frame by: extracting the watermark from the watermarked digital video frame; fetching, from one or more pre-defined regions of a memory resource, digital video data captured by the least two monitors, where the timestamp of the digital video data is equal to the timestamp of the watermarked digital video frame; generating a new watermark from the digital video data, where the generating comprises calculating the binary result of the digital video data, where the new watermark comprises the binary result; and comparing the new watermark to the watermark, where if the new watermark is equal to the watermark, the program code determined that the watermarked digital video frame is authentic.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
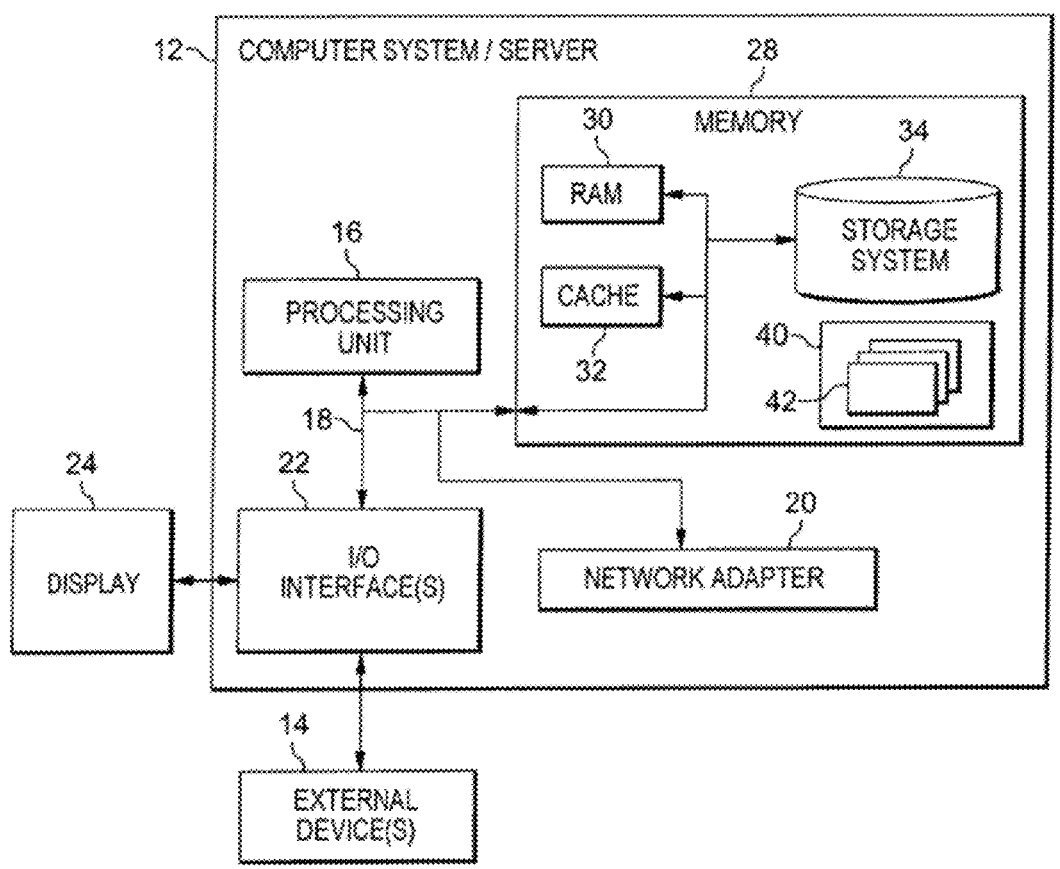
FIG. 6 depicts one embodiment of a cloud computing node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, both the video data repositories 420a-420c (FIG. 4) the encoder 400 and/or any server utilized as part of network 417 (FIG. 4) to facilitate communications between the video data repositories 420a-420c and the encoder 400, can be understood as cloud computing node 10 (FIG. 6) and if not a cloud computing node 10, then a general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12;

and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 7:
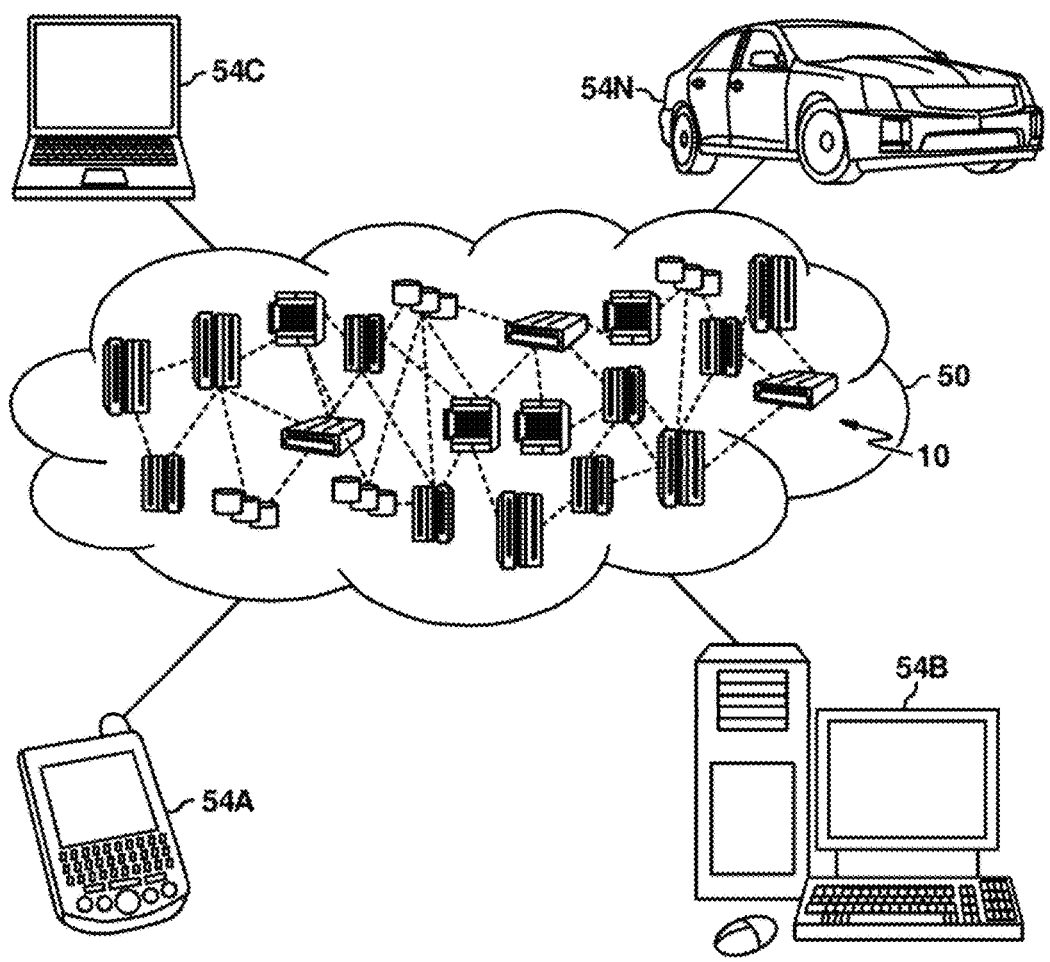
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
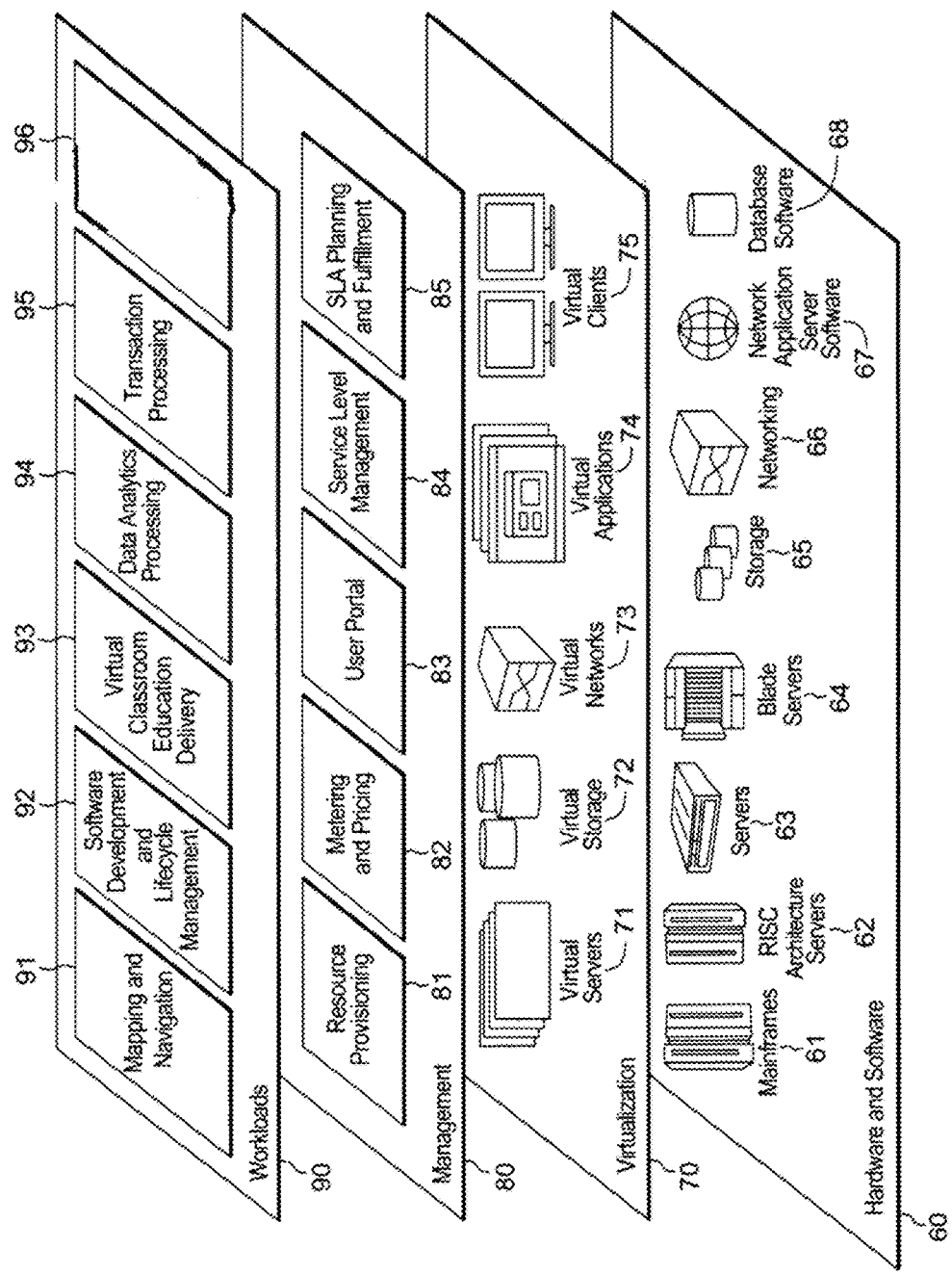
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below, which may include maintaining VPD at a VPD location the computer system. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating a watermark and embedding the watermark in a video frame 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
verifying, by one or more processors, authenticity of a watermarked digital video frame captured by a first monitor, wherein the verifying comprises:
   extracting, by the one or more processors, a watermark from the watermarked digital video frame;
   fetching, by the one or more processors, from one or more pre-defined regions of a memory resource, digital video data captured by at least two monitors, wherein a timestamp of the digital video data is equal to a timestamp of the watermarked digital video frame;
   generating, by the one or more processors, a new watermark from the digital video data captured by the at least two monitors, wherein the generating comprises calculating a binary result of the digital video data captured by the at least two monitors, wherein the new watermark comprises the binary result; and
   comparing, by the one or more processors, the new watermark to the watermark, wherein if the new watermark is equal to the watermark, the watermarked digital video frame is authentic.

2. The computer-implemented method of claim 1, wherein the first monitor comprises one of the at least two monitors.

3. The computer-implemented method of claim 1, wherein the first monitor does not comprise one of the at least two monitors.

4. The computer-implemented method of claim 1, wherein the memory resource comprises one or more video data repositories, and wherein each one or more video data repositories segments portions of digital video data of a monitor of the at least two monitors into regions.

5. The computer-implemented method of claim 1, wherein the fetching further comprises:
   determining, by the one or more processors, a current rule defining the one or more pre-defined regions; and
   fetching, by the one or more processors, the digital video data captured by at least two monitors from the one or more pre-defined regions defined by the rule.

6. The computer-implemented method of claim 5, wherein the determining the current rule is based on the timestamp of the watermarked digital video frame.

7. The computer-implemented method of claim 1, wherein calculating the binary result of the digital video data comprises:
    determining, by the one or more processors, a current encode rule, wherein the current encode rule comprises an algorithm generating a binary result when applied to the digital video data; and
    applying, by the one or more processors, the current encode rule to the digital video data.

8. The computer-implemented method of claim 7, wherein the current encode rule is selected from the group consisting of: a logic gate (XOR), a hash, and a binary algorithm.

9. The computer-implemented method of claim 7, wherein the determining the current encode rule is based on the timestamp of the watermarked digital video frame.

10. The computer-implemented method of claim 1, wherein the fetching further comprises accessing the one or more pre-defined regions of the memory resource over a private network.

11. The computer-implemented method of claim 1, further comprising:
    restoring, by the one or more processors, a portion of the digital video data by deriving the digital video data from the binary result;
    selecting, by the one or more processors, a portion of the digital video data from the derived digital video data; and
    committing, by the one or more processors, the portion of the digital video data, to the memory resource.

12. The computer-implemented method of claim 1, further comprising:
    obtaining, by the one or more processors, a request to generate another watermark and embed the other watermark in a digital video frame captured by a second monitor;
    based on obtaining the request, fetching, by the one or more processors, from one or more pre-defined regions of the memory resource, digital video data captured by the at least two monitors, wherein a timestamp of the digital video data is equal to a timestamp of the digital video frame captured by the second monitor;
    generating, by the one or more processors, the other watermark from the digital video data captured by the at least two monitors, wherein the generating comprises calculating a new binary result of the digital video data captured by the at least two monitors, wherein the other watermark comprises the new binary result; and
    embedding, by the one or more processors, the other watermark in the digital video frame captured by the second monitor.

13. A computer program product comprising:
    a non-transitory computer readable storage medium readable by one or more processors and storing instructions for execution by the one or more processors for performing a method comprising:
        verifying, by the one or more processors, authenticity of a watermarked digital video frame captured by a first monitor, wherein the verifying comprises:
            extracting, by the one or more processors, a watermark from the watermarked digital video frame;
            fetching, by the one or more processors, from one or more pre-defined regions of a memory resource, digital video data captured by at least two monitors, wherein a timestamp of the digital video data is equal to a timestamp of the watermarked digital video frame;
            generating, by the one or more processors, a new watermark from the digital video data captured by the at least two monitors, wherein the generating comprises calculating a binary result of the digital video data captured by the at least two monitors, wherein the new watermark comprises the binary result; and
            comparing, by the one or more processors, the new watermark to the watermark, wherein if the new watermark is equal to the watermark, the watermarked digital video frame is authentic.

14. The computer program product of claim 13, wherein the first monitor comprises one of the at least two monitors.

15. The computer program product of claim 13, wherein the first monitor does not comprise one of the at least two monitors.

16. The computer program product of claim 13, wherein the memory resource comprises one or more video data repositories, and wherein each one or more video data repositories segments portions of digital video data of a monitor of the at least two monitors into regions.

17. The computer program product of claim 15, wherein the fetching further comprises:
    determining, by the one or more processors, a current rule defining the one or more pre-defined regions; and
    fetching, by the one or more processors, the digital video data captured by at least two monitors from the one or more pre-defined regions defined by the rule.

18. The computer program product of claim 17, wherein the determining the current rule is based on the timestamp of the watermarked digital video frame.

19. The computer program product of claim 13, wherein calculating the binary result of the digital video data comprises:
    determining, by the one or more processors, a current encode rule, wherein the current encode rule comprises an algorithm generating a binary result when applied to the digital video data; and
    applying, by the one or more processors, the current encode rule to the digital video data.

20. A system comprising:
    a memory;
    a processor in communication with the memory; and
    program instructions executable by the processor via the memory to perform a method, the method comprising:
        verifying, by the one or more processors, authenticity of a watermarked digital video frame captured by a first monitor, wherein the verifying comprises:
            extracting, by the one or more processors, a watermark from the watermarked digital video frame;
            fetching, by the one or more processors, from one or more pre-defined regions of a memory resource, digital video data captured by at least two monitors, wherein a timestamp of the digital video data is equal to a timestamp of the watermarked digital video frame;
            generating, by the one or more processors, a new watermark from the digital video data captured by the at least two monitors, wherein the generating comprises calculating a binary result of the digital video data captured by the at least two monitors, wherein the new watermark comprises the binary result; and
            comparing, by the one or more processors, the new watermark to the watermark, wherein if the new watermark is equal to the watermark, the watermarked digital video frame is authentic.

* * * * *